(12) United States Patent
Matsubara et al.

(10) Patent No.: US 10,107,392 B2
(45) Date of Patent: Oct. 23, 2018

(54) CONTROL APPARATUS FOR VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Wataru Matsubara, Seto (JP); Ayumu Sagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 15/612,269

(22) Filed: Jun. 2, 2017

(65) Prior Publication Data
US 2017/0363204 A1   Dec. 21, 2017

(30) Foreign Application Priority Data

Jun. 16, 2016 (JP) .................. 2016-119987

(51) Int. Cl.
*F16H 61/14* (2006.01)
*F16D 48/06* (2006.01)
*F16H 45/02* (2006.01)

(52) U.S. Cl.
CPC .......... *F16H 61/143* (2013.01); *F16D 48/06* (2013.01); *F16D 2500/10412* (2013.01); *F16D 2500/3065* (2013.01); *F16D 2500/3066* (2013.01); *F16H 45/02* (2013.01); *F16H 2061/145* (2013.01)

(58) Field of Classification Search
CPC .. F16H 61/143; F16H 2061/145; F16D 48/06; F16D 2500/3065; F16D 2500/3066
See application file for complete search history.

(56) References Cited

U.S. PATENT DOCUMENTS 6,132,336 A * 10/2000 Adachi ................ F16H 61/143
477/169
2015/0006047 A1* 1/2015 Yamawaki ............. F16H 61/14
701/53

FOREIGN PATENT DOCUMENTS

JP  H05-180331 A  7/1993

* cited by examiner

*Primary Examiner* — Edwin A Young
(74) *Attorney, Agent, or Firm* — Oliff PLC

(57) ABSTRACT

In a control apparatus for a vehicle, in the cases where engine torque is higher than first torque and an engine torque change amount is larger than a first torque change amount when control is shifted from complete engagement control of a lock-up clutch to deceleration slip control, an electronic control unit is configured to shift the control from the complete engagement control to acceleration slip control and then shift the control from the acceleration slip control to the deceleration slip control after the vehicle is brought into a driven state.

3 Claims, 7 Drawing Sheets

CONTROL APPARATUS FOR VEHICLE AND CONTROL METHOD FOR VEHICLE

INCORPORATION BY REFERENCE

The disclosure of Japanese Patent Application No. 2016-119987 filed on Jun. 16, 2016 including the specification, drawings and abstract is incorporated herein by reference in its entirety.

BACKGROUND

1. Technical Field

The disclosure relates to a control apparatus for a vehicle and a control method for a vehicle.

2. Description of Related Art

As control of a lock-up clutch provided in a vehicle, complete engagement control to completely engage the lock-up clutch and slip control to control actual differential rotation of the lock-up clutch to target differential rotation are executed. The actual differential rotation of the lock-up clutch is a rotational speed difference between a clutch input rotational speed and a clutch output rotational speed.

A vehicle that includes the lock-up clutch is disclosed in Japanese Patent Application Publication No. 5-180331 (JP 5-180331 A). During a deceleration travel of the vehicle disclosed in JP 5-180331 A, control to switch among the complete engagement control, deceleration slip control, complete disengagement of the lock-up clutch (a torque converter state) is executed on the basis of an accelerator operation amount and an output shaft rotational speed. In such control, an engine speed during the deceleration travel can be maintained at a higher value than a certain value. Thus, a fuel cut period during the deceleration travel can be extended by maintaining the higher engine speed than a fuel-cut recovery speed, for example. As a result, a consumed fuel amount can be suppressed.

SUMMARY

As described above, in lock-up clutch control, the deceleration slip control is executed on the basis of the accelerator operation amount and the like during the deceleration travel.

For example, a vehicle that includes a multi-plate lock-up clutch with high clutch torque capacity and that can completely engage the lock-up clutch within a wide engine operation region has been available. In such a vehicle, the lock-up clutch may be brought into a completely engaged state even when engine torque is high. In such a situation, that is, when the control is shifted from the complete engagement control of the lock-up clutch in a high engine torque state to the deceleration slip control, the engine speed may rapidly be increased. In addition, when the complete engagement control of the lock-up clutch is continued while the engine torque is rapidly reduced from the high engine torque state, a shock (a chip-out shock) may occur at a time when the vehicle is switched from a driving state to a driven state.

The present disclosure provides a control apparatus for a vehicle and a control method for a vehicle capable of suppressing a rapid increase in an engine speed and a chip-out shock from occurring at a time when control is shifted from complete engagement control to slip control of a lock-up clutch in the vehicle that includes an engine, the lock-up clutch, and the like.

A first aspect of the present disclosure is a control apparatus for a vehicle. The vehicle includes an engine, a transmission, a torque converter, and a lock-up clutch. The torque converter is provided between the engine and the transmission. The lock-up clutch is provided in the torque converter. The control apparatus includes an electronic control unit. The electronic control unit is configured to execute complete engagement control, acceleration slip control, and deceleration slip control of the lock-up clutch. The acceleration slip control is control in which the lock-up clutch is controlled to achieve arbitrary differential rotation in an accelerated state of the vehicle. The deceleration slip control is control in which the lock-up clutch is controlled to achieve the arbitrary differential rotation in a decelerated state of the vehicle. The electronic control unit is configured to obtain engine torque of the engine and an engine torque change amount of the engine. The electronic control unit is configured to determine a driving state and a driven state of the vehicle. As a result of the electronic control unit determining that: (i) the engine torque is higher than first torque, and (ii) the engine torque change amount is larger than a first torque change amount, the electronic control unit is configured to shift the control from the complete engagement control to the acceleration slip control, and then shift the control from the acceleration slip control to the deceleration slip control after the vehicle is brought into the driven state. As a result of the electronic control unit determining that: (iii) the engine torque is higher than second torque and is equal to or lower than the first torque, and (iv) the engine torque change amount is larger than a second torque change amount and is equal to or smaller than the first torque change amount, the electronic control unit is configured to continue the complete engagement control, and then shift the control from the complete engagement control to the deceleration slip control after the vehicle is brought into the driven state. As a result of the electronic control unit determining that one of following conditions is satisfied: (v) the engine torque is equal to or lower than the second torque, and (vi) the engine torque change amount is equal to or smaller than the second torque change amount, the electronic control unit is configured to shift the control from the complete engagement control to the deceleration slip control.

A second aspect of the present disclosure is a control method for a vehicle. The vehicle includes an engine, a transmission, a torque converter, a lock-up clutch, and an electronic control unit. The torque converter is provided between the engine and the transmission. The lock-up clutch is provided in the torque converter. The control method includes: executing complete engagement control, acceleration slip control, and deceleration slip control of the lock-up clutch by the electronic control unit; obtaining, by the electronic control unit, engine torque of the engine and an engine torque change amount of the engine; and determining a driving state and a driven state of the vehicle by the electronic control unit. The acceleration slip control is control in which the lock-up clutch is controlled to achieve arbitrary differential rotation in an accelerated state of the vehicle. The deceleration slip control is control in which the lock-up clutch is controlled to achieve the arbitrary differential rotation in a decelerated state of the vehicle. The control method further includes: as a result of the electronic control unit determining that (i) the engine torque is higher than first torque, and (ii) the engine torque change amount is larger than a first torque change amount, shifting, by the electronic control unit, the control from the complete engagement control to the acceleration slip control, and then shifting the control from the acceleration slip control to the deceleration slip control after the vehicle is brought into the driven state; as a result of the electronic control unit determining that (iii) the engine torque is higher than second torque and is equal to or lower than the first torque, and (iv) the engine torque change amount is larger than a second torque change amount and is equal to or smaller than the first torque change amount, continuing, by the electronic control unit, the complete engagement control, and then shifting the control from the complete engagement control to the deceleration slip control after the vehicle is brought into the driven state; and as a result of the electronic control unit determining that one of following conditions is satisfied (v) the engine torque is equal to or lower than the second torque, and (vi) the engine torque change amount is equal to or smaller than the second torque change amount, shifting, by the electronic control unit, the control from the complete engagement control to the deceleration slip control.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a block diagram of a configuration of a control system that includes an ECU and the like;

DETAILED DESCRIPTION OF EMBODIMENTS

A description will hereinafter be made on an embodiment of the present disclosure on the basis of drawings.

Figure 1:
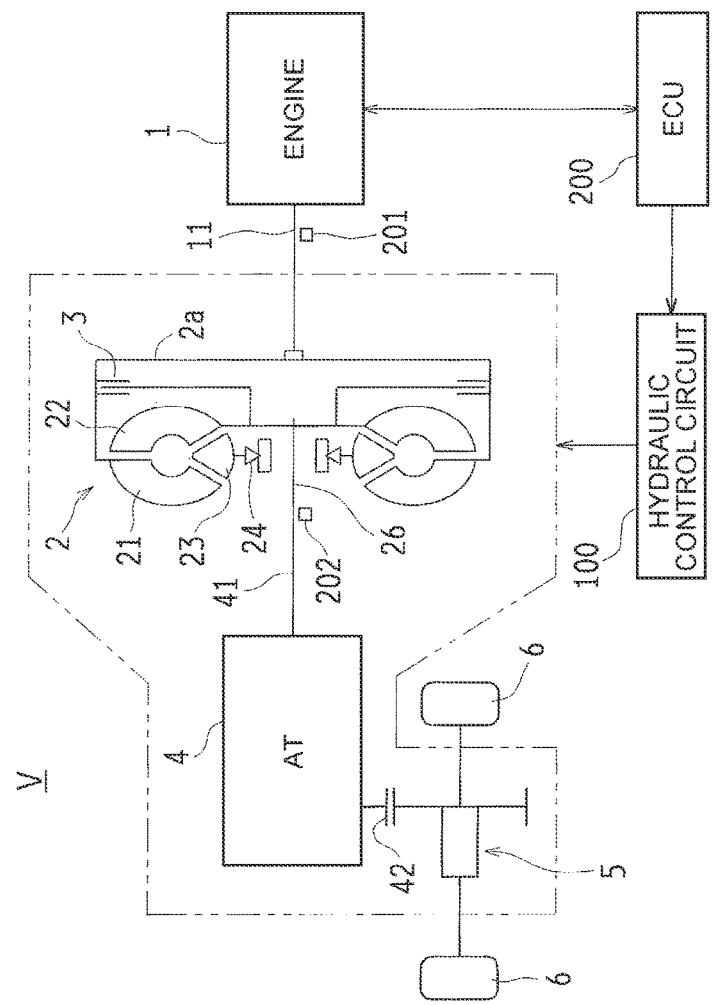
FIG. 1 is a schematic configuration diagram of one example of a vehicle according to an embodiment.

Referring to FIG. 1, a description will first be made on one example of a vehicle according to this embodiment.

A vehicle V of this example is a vehicle adopting a front-engine, front-wheel-drive (FF) layout. The vehicle V includes an engine 1, a torque converter 2, a multi-plate lock-up clutch 3, an automatic transmission (AT) 4, a differential 5, drive wheels (front wheels) 6, driven wheels (rear wheels: not shown), a hydraulic control circuit 100, an electronic control unit (ECU) 200, and the like.

A description will hereinafter be made on each of these engine 1, torque converter 2, multi-plate lock-up clutch 3, automatic transmission 4, hydraulic control circuit 100, and ECU 200.

The engine 1 is a traveling drive power source and is, for example, a multi-cylinder gasoline engine. Operation states of the engine 1, such as an intake air amount, a fuel injection amount, and ignition timing, are controlled. A crankshaft 11 as an output shaft of the engine 1 is coupled to the torque converter 2. A rotational speed of the crankshaft 11 (an engine speed Ne) is detected by an engine speed sensor 201. The intake air amount of the engine 1 is detected by an airflow meter 205.

The torque converter 2 includes a pump impeller 21 on an input shaft side, a turbine runner 22 on an output shaft side, a stator 23 that realizes a torque amplification function, and a one-way clutch 24. The torque converter 2 transmits power between the pump impeller 21 and the turbine runner 22 via fluid. In the torque converter 2, the multi-plate lock-up clutch 3 is provided to couple an input side and an output side of the torque converter 2 either directly or in a slipping state. A rotational speed of a turbine shaft 26 of the torque converter 2 (a turbine rotational speed Nt) is detected by a turbine rotational speed sensor 202.

Figure 2:
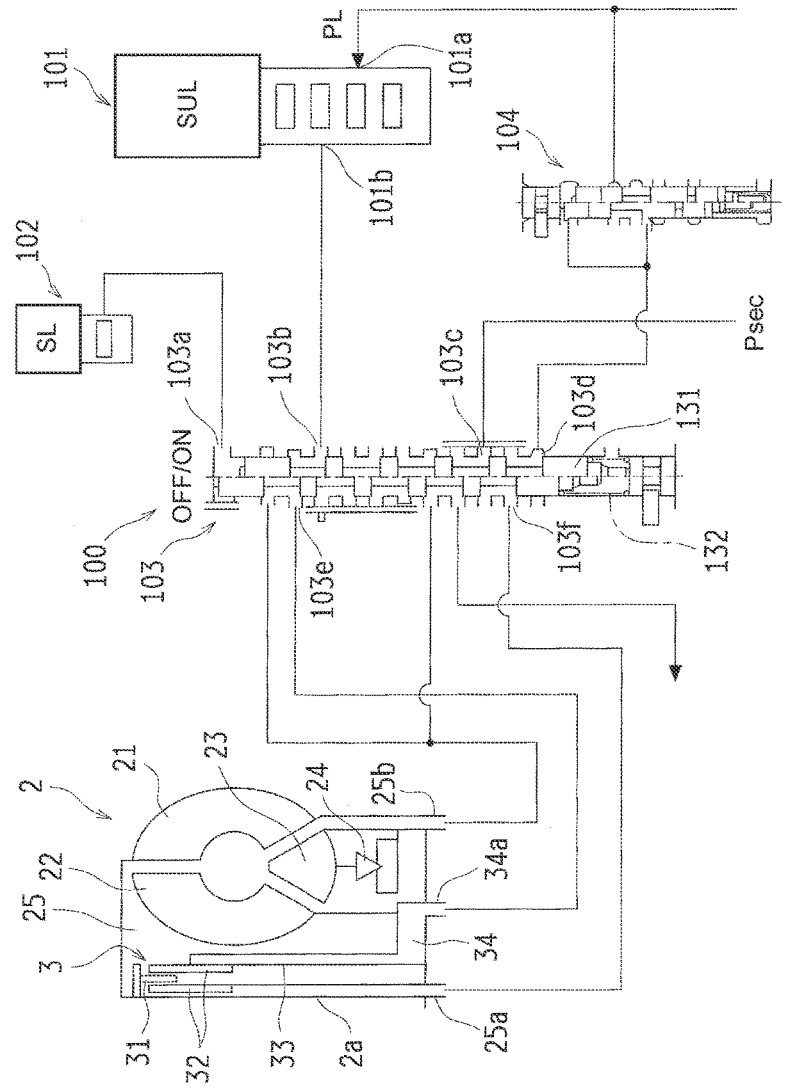
FIG. 2 is a circuit configuration diagram of a hydraulic control circuit.

As shown in FIG. 2, a converter fluid chamber 25 is provided in the torque converter 2, so as to circulate the operating fluid. The converter fluid chamber 25 is provided with: a T/C input port 25a from which the operating fluid is introduced; and a T/C output port 25b to which the operating fluid is discharged.

As shown in FIG. 2, the multi-plate lock-up clutch 3 includes clutch plates (friction engagement plates) 31, 32 and a lock-up piston 33 capable of pressing those clutch plates 31, 32. The clutch plate 31 is supported by a clutch hub, which is fixed to a front cover 2a of the torque converter 2, in an axially slidable manner. The clutch plate 32 is supported by a clutch hub, which is connected to the turbine runner 22, in an axially slidable manner. The lock-up piston 33 is provided in the torque converter 2 in an axially slidable manner. A lock-up fluid chamber 34 is provided on a back surface side (an opposite side from the front cover 2a) of the lock-up piston 33. The lock-up fluid chamber 34 is provided with an L/U pressure input port 34a, from which the operating fluid is introduced (hydraulic pressure is introduced) and to which the operating fluid is discharged.

In the multi-plate lock-up clutch 3 with such a structure, when the hydraulic pressure is supplied to the lock-up fluid chamber 34, the clutch plate 31 and the clutch plate 32 are engaged with each other to bring the multi-plate lock-up clutch 3 into an engaged state (a completely engaged state or a slipping gate). When a supply of the hydraulic pressure to the lock-up fluid chamber 34 is stopped, the lock-up piston 33 is actuated to a disengaged side due to an elastic force of a return spring (not shown) and brings the multi-plate lock-up clutch 3 into a disengaged state.

The automatic transmission 4 is a stepped transmission and includes plural hydraulic friction engagement elements and a planetary gear device. In the automatic transmission 4, plural gear stages (gear change stages) can selectively be established by selectively engaging the plural friction engagement elements. As shown in FIG. 1, an input shaft 41 of the automatic transmission 4 is coupled to the turbine shaft 26 of the torque converter 2. An output gear 42 of the automatic transmission 4 is coupled to the drive wheels 6 via the differential 5 and the like.

Next, referring to FIG. 2, a description will be made on the hydraulic control circuit 100. Note that FIG. 2 only shows a hydraulic circuit configuration of the torque converter 2 and the multi-plate lock-up clutch 3.

First, although not shown, the hydraulic control circuit 100 of this example includes an oil pump that is driven by the drive power of the engine 1 (there is also a case where an electric oil pump is provided), a primary regulator valve, a secondary regulator valve, and the like. The primary regulator valve regulates the hydraulic pressure that is generated by the oil pump. In this way, line pressure PL is generated. Then, the secondary regulator valve regulates the line pressure PL as source pressure to secondary pressure Psec.

The hydraulic control circuit 100, which is shown in FIG. 2, includes a linear solenoid valve (SLU) 101, a solenoid valve (SL) 102, a lock-up relay valve 103, a circulation modulator valve 104 (hereinafter referred to as a Cir-MOD valve 104), and the like.

By corresponding to a command (lock-up clutch instructed hydraulic pressure) from the ECU 200, the linear solenoid valve (SLU) 101 outputs control hydraulic pressure from an output port 101b. The control hydraulic pressure is generated by regulating the line pressure PL that is supplied to an input port 101a.

The solenoid valve (SL) 102 outputs signal pressure when being controlled to be ON by the command from the ECU 200. The Cir-MOD valve 104 outputs circulation modulator pressure (hereinafter referred to as Cir-MOD pressure) that is generated by regulating the line pressure PL. The lock-up relay valve 103 is a switching valve that is actuated by the signal pressure from the solenoid valve (SL) 102 and switches supply/discharge paths of the hydraulic pressure.

When the signal pressure from the solenoid valve (SL) 102 is not input to a signal pressure input port 103a, a spool 131 of the lock-up relay valve 103 is disposed at an upper position in FIG. 2 (a position of the spool 131 on a left side in FIG. 2) due to an urging force of a spring 132. Note that the time at which the signal pressure from the solenoid valve (SL) 102 is not input to the signal pressure input port 103a corresponds to a lock-up OFF state. In this way, the secondary pressure Psec is supplied to the T/C input port 25a (the converter fluid chamber 25) of the torque converter 2 via the lock-up relay valve 103 (ports 103c, 103f).

Meanwhile, when both of the linear solenoid valve (SLU) 101 and the solenoid valve (SL) 102 are turned on by the command from the ECU 200, and the signal pressure from the solenoid valve (SL) 102 is input to the signal pressure input port 103a of the lock-up relay valve 103 (in a lock-up ON state), the spool 131 moves downward against the urging force of the spring 132 and is disposed at a lower position in FIG. 2 (a position of the spool 131 on a right side in FIG. 2). In this way, the Cir-MOD pressure from the Cir-MOD valve 104 is supplied to the T/C input port 25a (the converter fluid chamber 25) of the torque converter 2 via the lock-up relay valve 103 (ports 103d, 103f). Furthermore, the control hydraulic pressure that is output by the linear solenoid valve (SLU) 101 is supplied to the L/U pressure input port 34a (the lock-up fluid chamber 34) of the multi-plate lock-up clutch 3 via the lock-up relay valve 103 (ports 103b, 103e). In this way, the multi-plate lock-up clutch 3 is brought into the engaged state (the completely engaged state or the slipping state).

Here, because the multi-plate lock-up clutch 3 can increase clutch torque capacity, an execution region (an engine operation region) of lock-up clutch control (complete engagement control or slip control of the lock-up clutch) can be expanded.

The ECU 200 includes a central processing unit (CPU), read only memory (ROM), random access memory (RAM), backup RAM, and the like.

The ROM stores various control programs, maps that are referred when those various control programs are executed, and the like. The CPU performs arithmetic operations on the basis of the various control programs and the maps stored in the ROM. The RAM is memory that temporarily stores results of the operations by the CPU, input data from each of the sensors, and the like. The backup RAM is non-volatile memory used to store data that should be stored at a stop of the engine 1 and the like.

Figure 3:
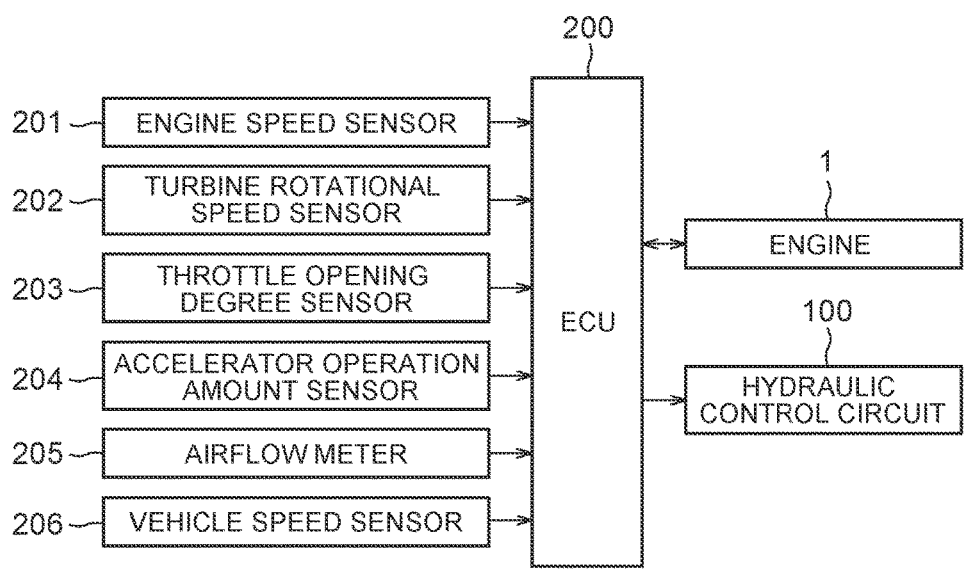

As shown in FIG. 3, various sensors such as the engine speed sensor 201, the turbine rotational speed sensor 202, a throttle opening degree sensor 203, an accelerator operation amount sensor 204, the airflow meter 205, and a vehicle speed sensor 206 are connected to the ECU 200. The throttle opening degree sensor 203 detects a throttle opening degree of a throttle valve (not shown). The accelerator operation amount sensor 204 detects an accelerator operation amount as a depression amount of an accelerator pedal (not shown). The airflow meter 205 detects the intake air amount of the engine 1. The vehicle speed sensor 206 outputs a signal corresponding to a speed of the vehicle V. The ECU 200 receives a signal from each of these sensors (including switches).

The ECU 200 controls the throttle opening degree, the fuel injection amount, the ignition timing, and the like on the basis of detection results by the various sensors and the like. In this way, the operation state of the engine 1 is controlled. The ECU 200 computes engine torque Te and an engine torque change amount $\Delta$Te.

The ECU 200 also executes gear change control (hydraulic control) of the automatic transmission 4, hydraulic control of the torque converter 2, and engagement control (also referred to as the lock-up clutch control) of the multi-plate lock-up clutch 3 by controlling the hydraulic control circuit 100. The ECU 200 further executes shifting control at a time when the control is shifted from the complete engagement control to deceleration slip control of the lock-up clutch, which will be described below.

Next, a description will be made on computation of the engine torque and the engine torque change amount. The ECU 200 computes the engine torque Te. More specifically, the ECU 200 computes the engine torque Te on the basis of the intake air amount, which is obtained from the output signal of the airflow meter 205, the engine speed Ne, which is obtained from the output signal of the engine speed sensor 201, the ignition timing of the engine 1, and the like, for example. The ECU 200 also computes a change amount of the engine torque Te per unit time (for example at every 16 msecs) (that is, the engine torque change amount $\Delta$Te). Note that the engine torque Te and the engine torque change amount $\Delta$Te may be computed by providing a torque sensor on the crankshaft 11 of the engine 1 and using an output signal of the torque sensor.

Next, a description will be made on the lock-up clutch control executed by the ECU 200.

In the lock-up clutch control, the complete engagement control to completely engage the multi-plate lock-up clutch 3 and the slip control (differential rotation control) are executed.

In the slip control, actual differential rotation between the engine speed Ne, which is obtained from the output signal of the engine speed sensor 201, and the turbine rotational speed Nt, which is obtained from the output signal of the turbine rotational speed sensor 202, (Ne–Nt: differential rotation of the multi-plate lock-up clutch 3) is computed, and lock-up clutch hydraulic pressure (instructed hydraulic pressure) is subjected to feedback control such that the actual differential rotation becomes target differential rotation. Here, the driving state is a state in which an engine speed Ne is higher than a turbine rotational speed Nt, and the driven state is a state in which the engine speed Ne is lower than the turbine rotational speed Nt.

Such slip control includes: acceleration slip control, which is executed in the case where the vehicle V is in the driving state (a case where Ne>Nt); and the deceleration slip control, which is executed when the vehicle V is in the driven state (a case where Ne<Nt). The ECU 200 can execute these acceleration slip control and deceleration slip control as well as the complete engagement control described above.

Next, a description will be made on the shifting control that is executed by the ECU 200 at the time when the control is shifted from the complete engagement control to the deceleration slip control.

First, in the vehicle V that includes the multi-plate lock-up clutch 3, the lock-up clutch can completely be engaged within the wide engine operation region. Thus, the multi-plate lockup clutch 3 may be brought into the completely engaged state even when the engine torque is high. When the control is immediately shifted to the deceleration slip control from such a situation (the complete engagement control of the lock-up clutch in a high engine torque state), the torque capacity of the multi-plate lock-up clutch 3 becomes insufficient, and, consequently, the engine speed may rapidly be increased. In addition, when the complete engagement control is continued while the engine torque is rapidly reduced from the high engine torque state, a shock (a chip-out shock) may occur at a time when the vehicle V is switched from the driving state to the driven state.

Note that the chip-out shock is a shock that occurs due to loss of backlash in a power transmission path of the vehicle V or the like when the vehicle V is switched from the driving state to the driven state.

This embodiment realizes control capable of suppressing the rapid increase in the engine speed and the chip-out shock from occurring at the time when the control is shifted from the complete engagement control to the slip control of the lock-up clutch in the vehicle V that includes the engine 1, the multi-plate lock-up clutch 3, and the like.

Referring to a flowchart in FIG. 4, a description will be made on one example of the shifting control at the time when the control is shifted from the complete engagement control to the deceleration slip control of the lock-up clutch. A control routine in FIG. 4 is repeatedly executed at every specified time (for example, at every 4 msecs) by the ECU 200.

Note that, in this shifting control, the ECU 200 computes the engine speed Ne and the turbine rotational speed Nt from the output signals of the engine speed sensor 201 and the turbine rotational speed sensor 202, respectively. The ECU 200 also computes the actual differential rotation (Ne−Nt). The ECU 200 further computes the engine torque Te and the engine torque change amount ΔTe in the above process.

Figure 4:
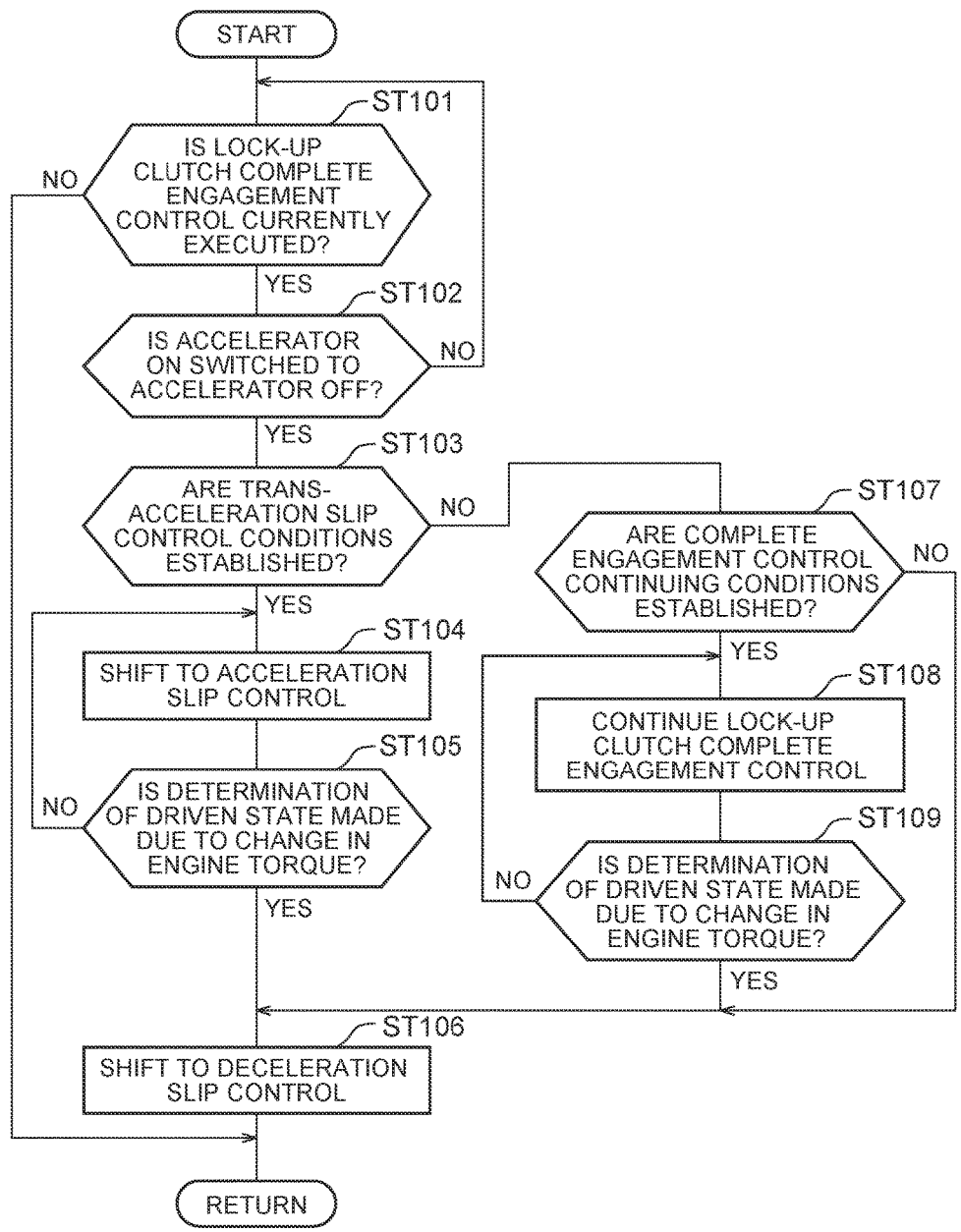
FIG. 4 is a flowchart that illustrates contents of shifting control at a time when control is shifted from complete engagement control to deceleration slip control of a lock-up clutch.

When the control routine in FIG. 4 is initiated, it is first determined in step ST101 whether the complete engagement control (the driving state) with the accelerator being ON is currently executed. If a determination result in step ST101 is a negative determination (NO), the process returns. If the determination result in step ST101 is a positive determination (YES), the process proceeds to step ST102.

In step ST102, the ECU 200 determines whether the accelerator ON is switched to the accelerator OFF on the basis of the output signal of the accelerator operation amount sensor 204. If a determination result in step ST102 is a negative determination (NO), the process returns. If the determination result in step ST102 is a positive determination (YES), it is determined that the control is shifted to the deceleration slip control, and the process proceeds to step ST103.

In step ST103, the ECU 200 determines whether trans-acceleration slip control conditions, which will be described below, are all established. If a determination result in step ST103 is a negative determination (NO), the process proceeds to step ST107. Note that the process in step ST107 will be described below. If the determination result in step ST103 is a positive determination (YES), it is considered that the rapid increase in the engine speed and the chip-out shock may occur at the time when the control is shifted from the complete engagement control to the deceleration slip control, and the process proceeds to step ST104.

The trans-acceleration slip control conditions in step ST103 include the engine torque Te>first torque A1 and the engine torque change amount ΔTe>a first torque change amount B1. Here, on the basis of a lower limit value of the engine torque Te, engine torque (a permissible value) with which neither the rapid increase in the engine speed nor the chip-out shock occurs is set as the first torque A1 that is used for the determination in step ST103. As the lower limit value of the engine torque Te, for example, a lower limit value of the engine torque Te, with which the engine speed is rapidly increased when the control is immediately shifted from the complete engagement control (the driving state) to the deceleration slip control (the driven state), or a lower limit value of the engine torque Te, with which the chip-out shock occurs when the vehicle is switched from the driving state to the driven state during the complete engagement control, is computed in advance by an experiment or a simulation.

Meanwhile, an engine torque change amount (a permissible value) with which the chip-out shock does not occur is set as the first torque change amount B1 on the basis of a lower limit value of the engine torque change amount ΔTe. As the lower limit value of the engine torque change amount ΔTe, for example, a lower limit value of the engine torque change amount ΔTe, with which the chip-out shock occurs when the complete engagement control is continued while the engine torque is rapidly reduced from the high engine torque state, is computed in advance by an experiment or a simulation.

In step ST104, the control is shifted from the complete engagement control to the acceleration slip control within such a range where the rapid increase in the engine speed can be permitted. In step ST105, it is determined whether the vehicle V is brought into the driven state due to the change in the engine torque during the acceleration slip control. If a determination result is a positive determination (YES), the process proceeds to step ST106. More specifically, it is determined that the vehicle V is brought into the driven state (the determination of YES is made in step ST105) when the engine torque Te is switched from a positive value (Te>0) to a negative value (Te<0). Then, the process proceeds to step ST106. If the determination result in step ST105 is a negative determination (NO), the acceleration slip control is continued.

Note that, as the determination of the driven state, such a determination that a relationship between the engine speed Ne and the turbine rotational speed Nt is switched to that in the driven state (Ne<Nt) may be made. Then, in step ST106, the control is shifted from the acceleration slip control to the deceleration slip control.

Next, if the determination result in above step ST103 is a negative determination (NO), that is, if possibility of the occurrence of the rapid increase in the engine speed and the chip-out shock is small, the process proceeds to step ST107.

In step ST107, it is determined whether complete engagement control continuing conditions, which will be described below, are all established. If a determination result is a positive determination (YES), it is considered that a possibility of an engine stall is small even when the complete engagement control is continued, and the process proceeds to step ST108.

The complete engagement control continuing conditions in step ST107 include: second torque A2<the engine torque Te≤the first torque A1; and a second torque change amount B2<the engine torque change amount ΔTe≤the first torque change amount B1. Here, as the second torque A2 that is used for the determination in step ST107, the engine torque Te that causes the engine stall when the complete engagement control is executed (continued) in an accelerator OFF state is computed in advance by an experiment or a simulation, and is set on the basis of a result thereof. In addition, similarly, as the second torque change amount B2, the engine torque change amount ΔTe that causes the engine stall when the complete engagement control is continued in the accelerator OFF state is computed in advance by an experiment or a simulation and is set on the basis of a result thereof.

In step ST108, the complete engagement control is continued. In step ST109, it is determined whether the vehicle V is brought into the driven state due to the change in the engine torque during the complete engagement control. If a determination result in step ST109 is a positive determination (YES), the process proceeds to step ST106. More specifically, it is determined that the vehicle V is brought into the driven state (the determination of YES is made in step ST109) when the engine torque Te is switched from the positive value (Te>0) to the negative value (Te<0). Then, the process proceeds to step ST106, and the control is shifted from the complete engagement control to the deceleration slip control.

On the other hand, if the determination result in step ST107 is a negative determination (NO), that is, if the above complete engagement control continuing conditions are not established (if the engine torque Te at a time when the accelerator is switched to OFF is [the engine torque Te≤the second torque A2], or if the engine torque change amount ΔTe at the time is [the engine torque change amount ΔTe≤the second torque change amount B2]), it is considered that the engine stall may occur. Accordingly, the control is shifted to the deceleration slip control (step ST106).

Next, referring to a timing chart in FIG. 5, a description will be made on one example of the shifting control at the time when the control is shifted from the complete engagement control to the deceleration slip control of the lock-up clutch.

Figure 5:
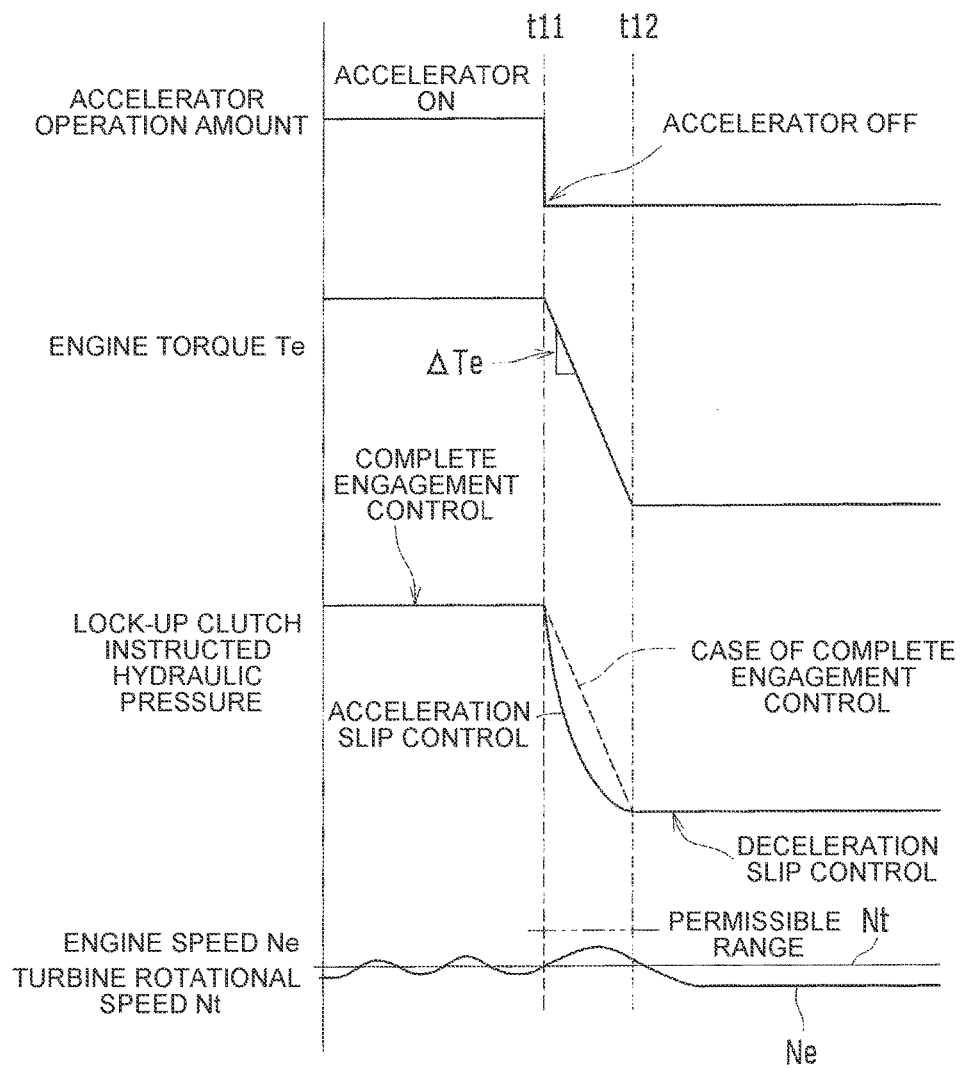
FIG. 5 is a timing chart of one example of the shifting control at the time when the control is shifted from the complete engagement control to the deceleration slip control of the lock-up clutch.

This example in FIG. 5 shows an example of the control in a case where the determination result in step ST103 of the control routine in FIG. 4 is the positive determination (YES), that is, the case where the control is shifted from the complete engagement control to the deceleration slip control of the lock-up clutch through the acceleration slip control.

First, during the complete engagement control of the lock-up clutch (the driving state) with the accelerator being ON, the accelerator is turned OFF at a time point t11. Then, in the cases where engine torque Te at the time point is [the engine torque Te>the first torque A1] and the engine torque change amount ΔTe after switching to the accelerator OFF is [the engine torque change amount ΔTe>the first torque change amount B1] (in the case where the engine torque Te is rapidly reduced), the control is shifted from the complete engagement control to the acceleration slip control of the lock-up clutch.

The lock-up clutch instructed hydraulic pressure (a solid line in FIG. 5) in the acceleration slip control is set as lower hydraulic pressure than the lock-up clutch instructed hydraulic pressure (a broken line in FIG. 5) in the complete engagement control of the lock-up clutch. In this way, the chip-out shock can be suppressed from occurring. In addition, the lock-up clutch instructed hydraulic pressure in the acceleration slip control is set as hydraulic pressure that falls within a permissible range where the rapid increase in the engine speed can be permitted when the control is shifted from the complete engagement control to the acceleration slip control of the lock-up clutch.

Then, at a time point t12, at which the engine torque Te is changed (Te>0→Te<0) and the vehicle V is switched to be in the driven state, the control is shifted to the deceleration slip control. In the deceleration slip control, the lock-up clutch instructed hydraulic pressure is controlled such that the actual differential rotation (Ne−Nt) between the engine speed Ne and the turbine rotational speed Nt becomes target actual differential rotation.

As it has been described so far, in this example, in the cases where the engine torque Te is high, the engine torque change amount ΔTe is large, and the rapid increase in the engine speed and the chip-out shock may occur during the complete engagement control of the lock-up clutch (the driving state), the control is shifted from the complete engagement control to the acceleration slip control of the lock-up clutch. Then, after the vehicle V is switched from the driving state to the driven state, the control is shifted to the deceleration slip control.

The control is shifted from the complete engagement control to the deceleration slip control of the lock-up clutch through the acceleration slip control, just as described. In this way, in a period before the vehicle V is brought into the driven state, the torque capacity of the multi-plate lock-up clutch 3 can be controlled to an appropriate value that corresponds to the high engine torque and the rapid reduction in the engine torque (the torque capacity with which the rapid increase in the engine speed and the chip-out shock are less likely to occur) by the acceleration slip control. Accordingly, when the vehicle V is brought into the driven state and the control is then shifted to the deceleration slip control, the rapid increase in the engine speed and the chip-out shock can be suppressed from occurring.

Next, referring to a timing chart in FIG. 6, a description will be made on another example of the shifting control at the time when the control is shifted from the complete engagement control to the deceleration slip control of the lock-up clutch.

Figure 6:
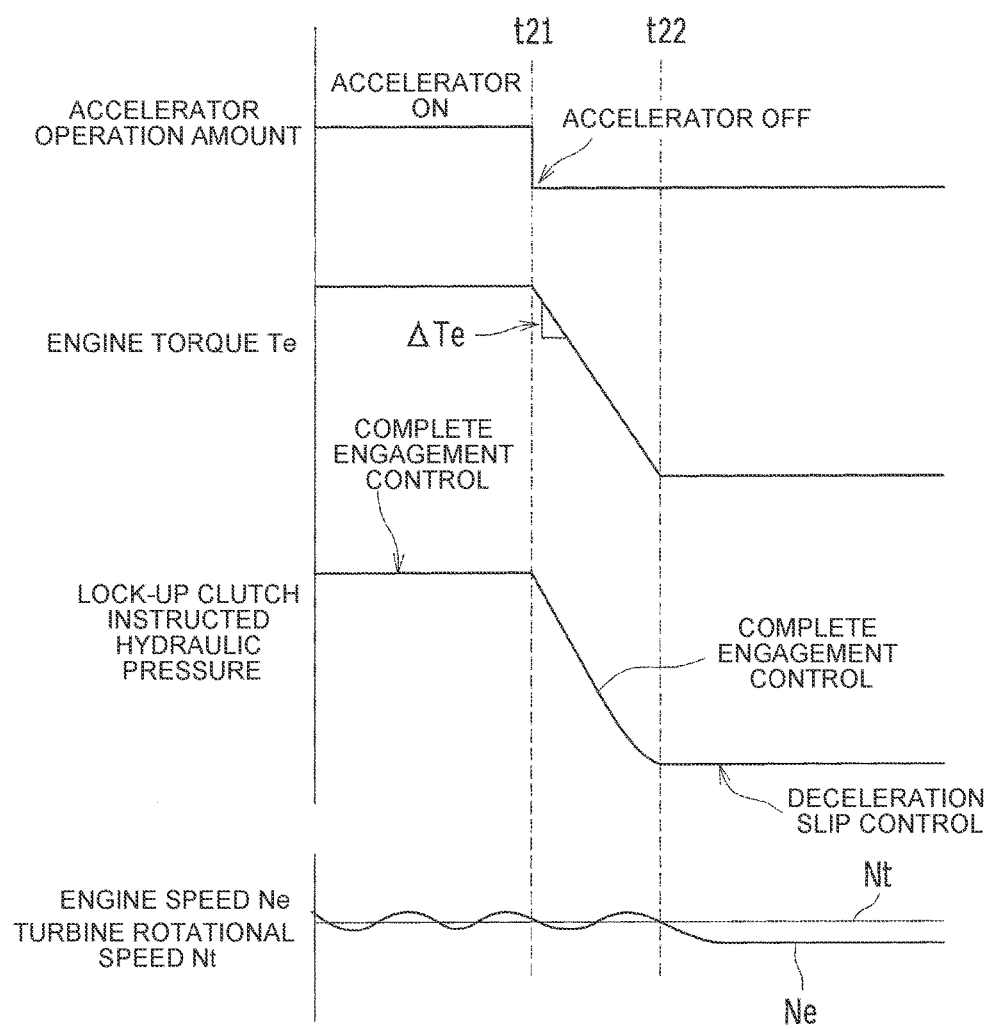
FIG. 6 is a timing chart of another example of the shifting control at the time when the control is shifted from the complete engagement control to the deceleration slip control of the lock-up clutch.

This example in FIG. 6 shows an example of the control in a case where the determination result in step ST107 of the control routine in FIG. 4 is the positive determination (YES), that is, the case where, even when the accelerator is switched to OFF during the complete engagement control of the lock-up clutch, the complete engagement control of the lock-up clutch is continued, and the control is shifted to the deceleration slip control after the vehicle V is brought into the driven state.

First, during the complete engagement control of the lock-up clutch with the accelerator ON, the accelerator is turned OFF at a time point t21. Then, in the cases where engine torque Te at the time point is [the second torque A2<the engine torque Te≤the first torque A1] and the engine torque change amount ΔTe is [second torque change amount B2<the engine torque change amount ΔTe≤the first torque change amount B1] (in the case where the possibility of the occurrence of the chip-out shock and the engine stall is small), the complete engagement control of the lock-up clutch is continued.

Then, at a time point t22 at which the engine torque Te is changed (Te>0→Te<0) and the vehicle V is switched to be in the driven state, the control is shifted to the deceleration slip control. In the deceleration slip control, the lock-up clutch instructed hydraulic pressure is controlled such that the actual differential rotation (Ne−Nt) between the engine speed Ne and the turbine rotational speed Nt becomes the target actual differential rotation.

As it has been described so far, in this example, in the cases where the accelerator is turned OFF during the complete engagement control of the lock-up clutch (the driving state) and the possibility of the occurrence of the chip-out shock and the engine stall is small, the complete engagement control of the lock-up clutch is continued. Then, after the vehicle V is switched from the driving state to the driven state, the control is shifted to the deceleration slip control. Just as described, when the possibility of the occurrence of the chip-out shock and the engine stall is small, the complete engagement control of the lock-up clutch is continued. In this way, fuel economy and drivability can be optimized.

Next, referring to a timing chart in FIG. 7, a description will be made on yet another example of the shifting control at the time when the control is shifted from the complete engagement control to the deceleration slip control of the lock-up clutch.

Figure 7:
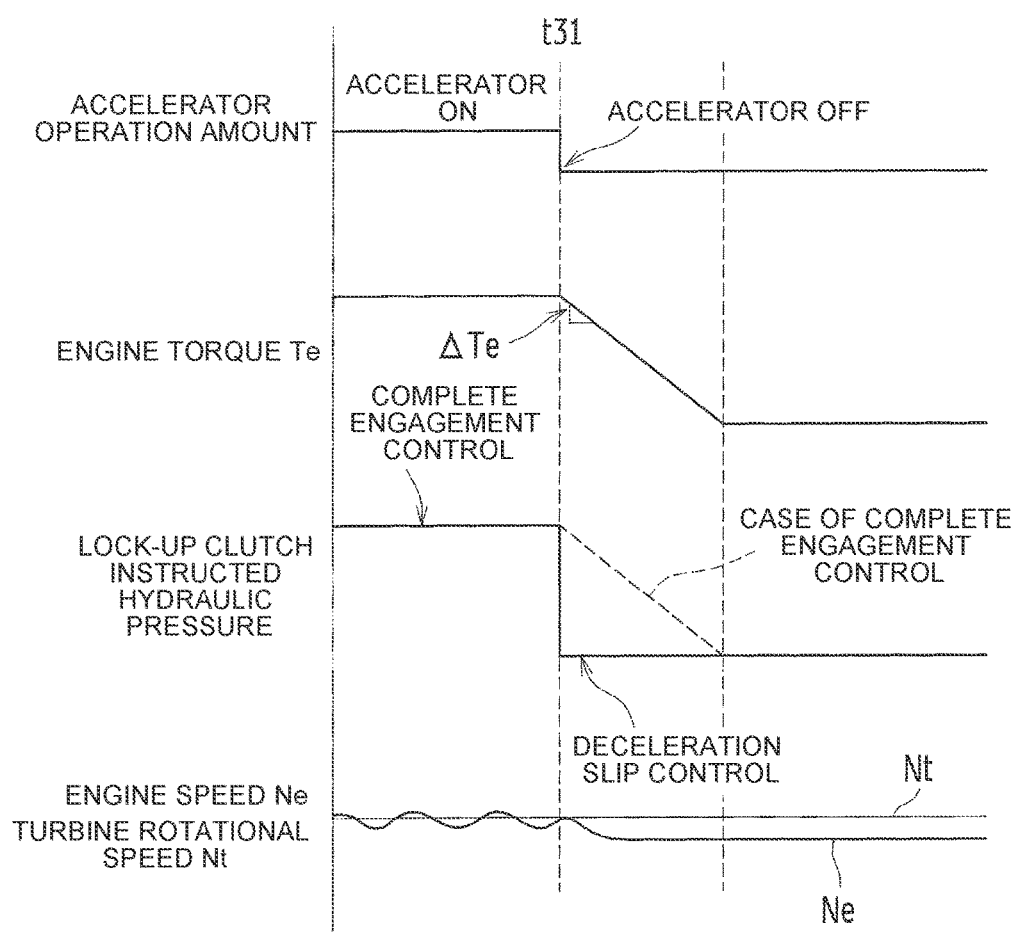
FIG. 7 is a timing chart of yet another example of the shifting control at the time when the control is shifted from the complete engagement control to the deceleration slip control of the lock-up clutch.

This example in FIG. 7 shows an example of the control in a case where the determination results in both of step ST103 and step ST107 of the control routine in FIG. 4 are the negative determinations (NO), that is, the case where the control is directly shifted from the complete engagement control to the deceleration slip control of the lock-up clutch without interposing the acceleration slip control therebetween.

In this example, during the complete engagement control of the lock-up clutch with the accelerator being ON, the accelerator is turned OFF at a time point t31. Then, in the cases where the engine torque Te at the time point is [the engine torque Te≤the second torque A2] or the engine torque change amount ΔTe is [the engine torque change amount ΔTe≤the second torque change amount B2] and where the complete engagement control of the lock-up clutch is continued (a broken line in FIG. 7), the engine stall may occur. Accordingly, the control is shifted to the deceleration slip control at the time point t31, at which the accelerator is switched to be OFF.

As it has been described so far, in this example, in the cases where the accelerator is turned OFF during the complete engagement control of the lock-up clutch (the driving state) and the engine torque Te (or the engine torque change amount ΔTe) is low, the control is immediately shifted to the deceleration slip control. Thus, the engine stall can be prevented.

Note that the embodiment disclosed herein is merely illustrative in all respects and thus does not serve as the ground for restrictive interpretation. Therefore, the technical scope of the disclosure is not interpreted by the above-described embodiment only but is defined on the basis of the claims. In addition, the technical scope of the disclosure includes all modifications falling within the claims and equivalents thereof.

For example, in the embodiment described so far, the engine torque Te and the engine torque change amount ΔTe, which are used for the determinations in step ST105 and step ST109 of the control routine in FIG. 4, are computed on the basis of the intake air amount, the engine speed Ne, the ignition timing, and the like (or computed on the basis of the output signal of the torque sensor). However, the disclosure is not limited thereto. For example, as another embodiment, when torque demand control is applied to the engine 1, the determinations in step ST105 and step ST109 of the control routine in FIG. 4 may be made by using target engine torque and a target engine torque change amount. In addition, the engine torque change amount ΔTe may be replaced with a change amount of an accelerator operation amount that is obtained from the output signal of the accelerator operation amount sensor 204.

In the embodiment described so far, the description has been made on the example in which the disclosure is applied to the vehicle including the stepped (planetary gear type) automatic transmission (AT), the gear stage of which is set by using friction engagement devices such as the clutches and the brakes and the planetary gear device. However, the disclosure is not limited thereto and can also be applied to a vehicle including a continuously variable transmission (CVT) in which a gear ratio is seamlessly adjusted.

In the embodiment described so far, the description has been made on the example in which the control apparatus of the disclosure is applied to the vehicle adopting the FF layout. However, the disclosure is not limited thereto and can also be applied to a vehicle adopting a front-engine, rear-wheel-drive (FR) layout and a four-wheel-drive vehicle.

Here, in the disclosure, two types of the shifting control may be executed by the same system. As the one type of the shifting control, in the cases where the engine torque is [the engine torque>the first torque A1] and the engine torque change amount is [the engine torque change amount>the first torque change amount B1] when the control is shifted from the complete engagement control to the deceleration slip control of the lock-up clutch, the control is shifted to the acceleration slip control, and is then shifted to the deceleration slip control after the vehicle is brought into the driven state (the control in step ST103 to step ST106 of the control routine in FIG. 4). As the other type of the shifting control, in the case where the engine torque is [the engine torque≤the second torque A2] or the engine torque change amount is [the engine torque change amount≤the second torque change amount B2], the control is immediately shifted to the deceleration slip control (the control in step ST107 to step ST106 of the control routine in FIG. 4).

According to the above configuration, in the cases where the engine torque is higher than the first torque and the engine torque change amount is larger than the first torque change amount when the control is shifted from the complete engagement control to the deceleration slip control of the lock-up clutch, it is considered that the rapid increase in the engine speed and the chip-out shock may occur. Accordingly, the control is shifted from the complete engagement control to the acceleration slip control of the lock-up clutch, and is then shifted to the deceleration slip control after the vehicle is brought into the driven state.

The control is shifted from the complete engagement control to the deceleration slip control of the lock-up clutch through the acceleration slip control, just as described. In this way, in the period before the vehicle is brought into the driven state, the torque capacity of the lock-up clutch can be controlled to the appropriate value that corresponds to the high engine torque and the rapid reduction in the engine torque (the torque capacity with which the rapid increase in the engine speed and the chip-out shock are less likely to occur) by the acceleration slip control. Accordingly, when the vehicle is brought into the driven state and the control is then shifted to the deceleration slip control, the rapid increase in the engine speed and the chip-out shock can be suppressed from occurring.

According to the above configuration, in the cases where the engine torque is equal to or lower than the first torque and the engine torque change amount is equal to or smaller than the first torque change amount when the control is shifted from the complete engagement control to the deceleration slip control of the lock-up clutch, it is considered that the possibility of the occurrence of the rapid increase in the engine speed and the chip-out shock is small. Accordingly, the complete engagement control of the lock-up clutch is continued, and the control is then shifted to the deceleration slip control after the vehicle is brought into the driven state. Just as described, when the possibility of the occurrence of the chip-out shock and the engine stall is small, the complete engagement control of the lock-up clutch is continued. In this way, the fuel economy and the drivability can be optimized.

However, in the cases where a magnitude of the engine torque (the engine torque change amount) at the time when the control is shifted from the complete engagement control to the deceleration slip control of the lock-up clutch is low and the complete engagement control of the lock-up clutch is continued, the engine stall may occur. In consideration of this point, lower limits of the engine torque and the engine torque change amount (the engine torque>the second torque, the engine torque change amount>the second torque change amount) in a case where the complete engagement control of the lock-up clutch is continued are set.

When the engine torque is equal to or lower than the second torque, or when the engine torque change amount is equal to or smaller than the second torque change amount, the control is immediately shifted from the complete engagement control to the deceleration slip control of the lock-up clutch. In this way, the engine stall is prevented.

According to the above configuration, the rapid increase in the engine speed and the chip-out shock can be suppressed from occurring when the control is shifted from the complete engagement control to the slip control of the lock-up clutch in the vehicle that includes the engine, the lock-up clutch, and the like.

The disclosure can effectively be used for the control of the lock-up clutch in the vehicle that includes the engine, the lock-up clutch, and the like.

What is claimed is:

1. A control apparatus for a vehicle, the vehicle including an engine, a transmission, a torque converter, and a lock-up clutch, the torque converter being provided between the engine and the transmission, and the lock-up clutch being provided in the torque converter,
the control apparatus comprising
an electronic control unit configured to execute complete engagement control, acceleration slip control, and deceleration slip control of the lock-up clutch,
the acceleration slip control being control in which the lock-up clutch is controlled to achieve arbitrary differential rotation in an accelerated state of the vehicle, and
the deceleration slip control being control in which the lock-up clutch is controlled to achieve the arbitrary differential rotation in a decelerated state of the vehicle,
the electronic control unit being configured to obtain engine torque of the engine and an engine torque change amount of the engine,
the electronic control unit being configured to determine a driving state and a driven state of the vehicle;
as a result of the electronic control unit determining that:
(i) the engine torque is higher than first torque, and
(ii) the engine torque change amount is larger than a first torque change amount,
the electronic control unit being configured to shift the control from the complete engagement control to the acceleration slip control, and then shift the control from the acceleration slip control to the deceleration slip control after the vehicle is brought into the driven state;
as a result of the electronic control unit determining that:
(iii) the engine torque is higher than second torque and is equal to or lower than the first torque, and
(iv) the engine torque change amount is larger than a second torque change amount and is equal to or smaller than the first torque change amount,
the electronic control unit being configured to continue the complete engagement control, and then shift the control from the complete engagement control to the deceleration slip control after the vehicle is brought into the driven state, and
as a result of the electronic control unit determining that one of following conditions is satisfied:
(v) the engine torque is equal to or lower than the second torque, and
(vi) the engine torque change amount is equal to or smaller than the second torque change amount,
the electronic control unit being configured to shift the control from the complete engagement control to the deceleration slip control.

2. The control apparatus according to claim 1, wherein
the driving state is a state in which an engine speed is higher than a turbine rotational speed, the turbine rotational speed is a rotational speed of a turbine shaft of the torque converter, and
the driven state is a state in which the engine speed is lower than the turbine rotational speed.

3. A control method for a vehicle, the vehicle including an engine, a transmission, a torque converter, a lock-up clutch, and an electronic control unit, the torque converter being provided between the engine and the transmission, and the lock-up clutch being provided in the torque converter,
the control method comprising:
executing complete engagement control, acceleration slip control, and deceleration slip control of the lock-up clutch by the electronic control unit,
the acceleration slip control being control in which the lock-up clutch is controlled to achieve arbitrary differential rotation in an accelerated state of the vehicle, and
the deceleration slip control being control in which the lock-up clutch is controlled to achieve the arbitrary differential rotation in a decelerated state of the vehicle;
obtaining, by the electronic control unit, engine torque of the engine and an engine torque change amount of the engine;
determining, by the electronic control unit, a driving state and a driven state of the vehicle;
as a result of the electronic control unit determining that:
(i) the engine torque is higher than first torque, and
(ii) the engine torque change amount is larger than a first torque change amount, shifting, by the electronic control unit, the control from the complete engagement control to the acceleration slip control, and then shifting the control from the acceleration slip control to the deceleration slip control after the vehicle is brought into the driven state;
as a result of the electronic control unit determining that:
  (iii) the engine torque is higher than second torque and is equal to or lower than the first torque, and
  (iv) the engine torque change amount is larger than a second torque change amount and is equal to or smaller than the first torque change amount,
continuing, by the electronic control unit, the complete engagement control, and then shifting the control from the complete engagement control to the deceleration slip control after the vehicle is brought into the driven state; and
as a result of the electronic control unit determining that one of following conditions is satisfied:
  (v) the engine torque is equal to or lower than the second torque, and
  (vi) the engine torque change amount is equal to or smaller than the second torque change amount,
shifting, by the electronic control unit, the control from the complete engagement control to the deceleration slip control.

* * * * *